United States Patent [19]

Shimura et al.

[11] Patent Number: 6,095,656

[45] Date of Patent: Aug. 1, 2000

[54] BACKLIGHTING APPARATUS AND DISPLAY APPARATUS USING THE SAME

[75] Inventors: Kei Shimura; Yoshinori Honguh, both of Yokohama, Japan

[73] Assignee: Kabushiki Kaisha Toshiba, Kawasaki, Japan

[21] Appl. No.: 09/136,886

[22] Filed: Aug. 19, 1998

[30] Foreign Application Priority Data

Sep. 15, 1997 [JP] Japan .................................... 9-250856

[51] Int. Cl.⁷ ...................................................... G09F 13/04
[52] U.S. Cl. ................................................ 362/97; 362/30
[58] Field of Search ................................ 362/291, 30, 97

[56] References Cited

U.S. PATENT DOCUMENTS

| | | | |
|---|---|---|---|
| 4,989,122 | 1/1991 | Allekotte et al. | 362/97 |
| 5,396,350 | 3/1995 | Beeson et al. | 359/40 |
| 5,459,592 | 10/1995 | Shibatani et al. | 359/40 |
| 5,504,545 | 4/1996 | Hagihara et al. | 362/97 X |

FOREIGN PATENT DOCUMENTS

| | | |
|---|---|---|
| 6-3621 | 1/1994 | Japan . |
| 6-317795 | 11/1994 | Japan . |
| 8-33540 | 3/1996 | Japan . |
| 8-171055 | 7/1996 | Japan . |
| 8-221013 | 8/1996 | Japan . |
| 9-138398 | 5/1997 | Japan . |

Primary Examiner—Stephen Husar
Attorney, Agent, or Firm—Oblon, Spivak, McClelland, Maier & Neustadt, P.C.

[57] ABSTRACT

A backlighting apparatus for radiating light on a flat surface to be illuminated comprises a light source having a linear light emitting portion, a light shield section, provided along an outer periphery of the light source on the side of the to-be-illuminated surface, for shielding light traveling directly from the light source toward the to-be-illuminated surface, and a first optical element provided in a longitudinal direction of the light source such that the first optical element faces the light source, the first optical element having a reflection surface for reflecting light emitted from the light source toward the to-be-illuminated surface. A cross-sectional shape of the reflection surface in a direction perpendicular to the longitudinal direction of the light source is determined such that light reflected by the reflection surface of the first optical element has a substantially uniform illuminance distribution on the to-be-illuminated surface.

14 Claims, 10 Drawing Sheets

BACKLIGHTING APPARATUS AND DISPLAY APPARATUS USING THE SAME

BACKGROUND OF THE INVENTION

The present invention relates to a backlighting apparatus such as an illumination light source for a flat panel display, and a display apparatus using the same.

A liquid-crystal display (LCD) apparatus is thin and light and has great utility as low-power-consumption display apparatus. The LCD apparatus are widely used as display devices for notebook-type personal computers, and have recently been used as display devices in some types of office-use desktop type computers.

The LCD display apparatus comprises a plate-like display panel called "flat panel." The LCD display apparatus has advantageous in that compared to a display apparatus using a CRT, the LCD display apparatus has a smaller depth dimension and requires a narrower space for installation.

Figure 1:
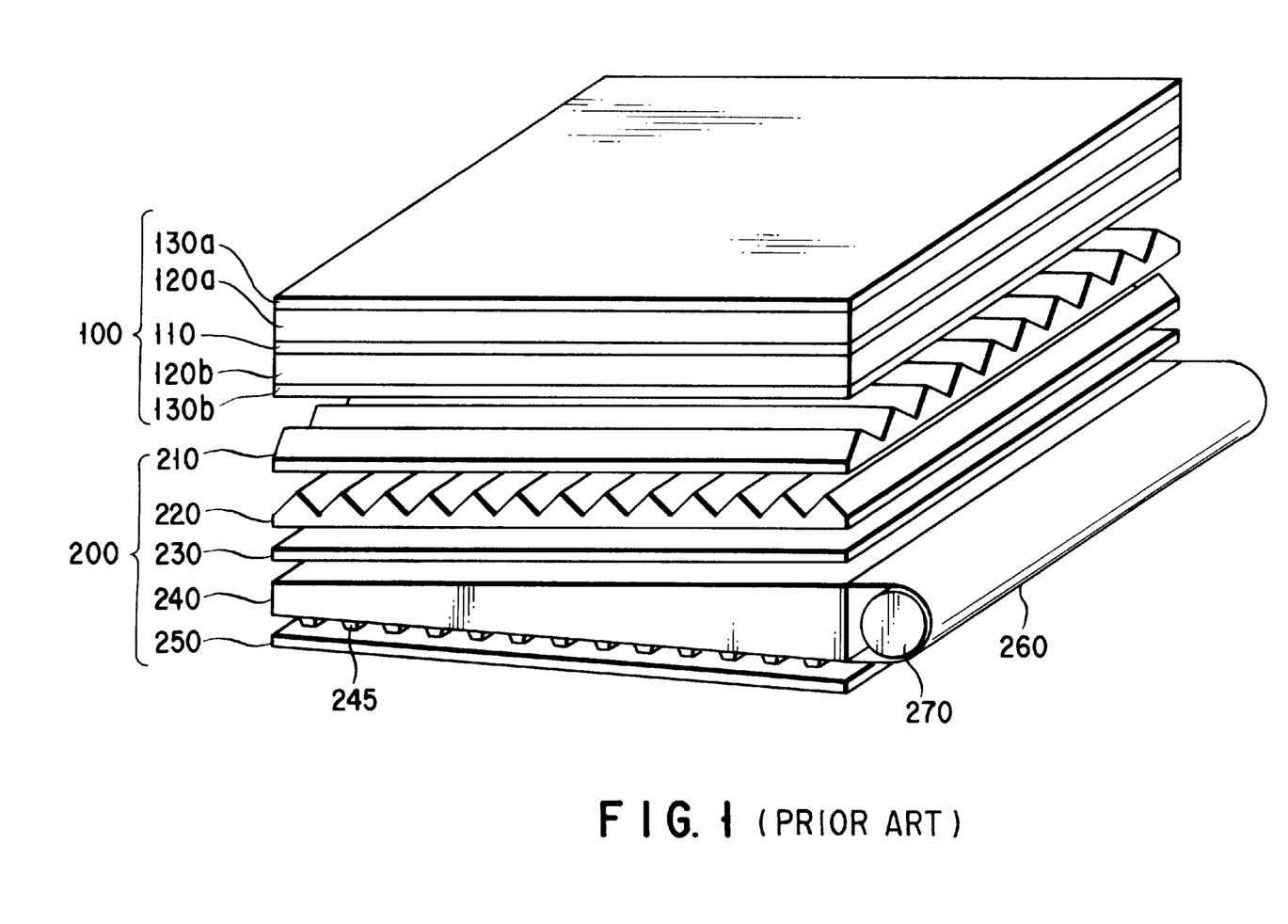
FIG. 1 is a perspective view showing a structure of a conventional side-light type liquid crystal display (LCD) apparatus.

It is expected that the LCD display apparatus will be used to realize a wall-type large-screen TV for household use. FIG. 1 shows an example of a typical structure of a conventional LCD apparatus.

As is shown in FIG. 1, the LCD apparatus comprises a liquid-crystal (LC) panel 100 and a backlight 200 for illuminating the LC panel 100. The LC panel 100 comprises an LC layer 110, two glass plates 120a and 120b sandwiching the LC panel 100, and two polarizing plates 130a and 130b sandwiching the glass plates 120a and 120b.

The glass plates 120a and 120b are provided with transparent electrodes for driving the liquid crystal and switching elements such as thin-film transistors. The voltage applied to the LC layer 110 is controlled by a drive signal delivered from a drive circuit (not shown).

The polarization state of light passing through the LC layer 110 is varied in accordance with the voltage applied to the LC layer 110. In accordance with the polarization state, the light transmissivity of the LC panel 100 varies and gray-level display is achieved.

The backlight 200 for illuminating the LC panel 100 comprises a fluorescent tube 270, a reflection plate 260 surrounding the fluorescent tube 270 and a light guide plate 240, a reflection plate 250 disposed under the light guide plate 240, a diffusion plate 230 disposed over the light guide plate 240, and two prism sheets 220 and 210 disposed over the diffusion plate 230.

Light emanating from the light source or the fluorescent tube 270 is made incident on the light guide plate 240 directly or after reflected by the reflection plate 260. The light propagates through the light guide plate 240 while repeating total reflection, and part of the light is dispersed by dispersion marks 245 formed on the lower surface of the light guide plate 240.

The dispersed light travels directly or is reflected by the reflection plate 250 to the LC panel, and then it is diffused by the diffusion plate 230. The diffused light travels through the two prism sheets 220 and 210 and illuminates the LC panel 100.

If the dispersion marks 245 are arranged optimally, uniform illumination is achieved. In addition, the directivity of illumination light is improved by the prism sheets 220 and 210, so that the luminance of display, as viewed from the front face of the LC panel on the observer's side (opposite to the side of the backlight 200) is improved.

As has been described above, the thin and light display apparatus is achieved by combining the LC panel 100 and the backlight 200 comprising thin plate-like members. However, compared to the CRT display apparatus, the conventional LCD apparatus are not satisfactory with respect to the screen size and screen luminance. A larger screen and a higher luminance are desired for the LCD apparatus. Besides, the conventional LCD apparatus has a relatively narrow range of viewing zone in which high-quality display is obtained. An enlargement of the viewing zone is also desired.

The enlargement in screen size and the increase in viewing zone are mutually associated objects to be achieved. In a general LC panel, modulation characteristics relative to illumination light obliquely incident on the panel vary in accordance with the incidence angle of the illumination light. Consequently, when the screen is viewed obliquely, the contrast may decrease or the light/dark contrast may be inverted.

In a large-screen display apparatus, the angle between a line normal to the screen and the line of sight is very large at the four corners of the screen, is Even in such a situation, good display characteristics have to be maintained. In addition, in order to enlarge the viewing zone, good display characteristics have to be maintained when the screen is viewed obliquely.

A method of using a backlight which can provide illumination light with good directivity is known as one of methods for improving display characteristics. According to this method, the backlight emits light with very high directivity, e.g. with a broadening angle of ±10°, and the LC panel is illuminated with this light.

With the light of such a broadening angle, good modulation characteristics can be obtained even in the conventional LC panel. The modulated light is diffused through the diffusion layer 230 provided on the observer side of the LC layer of the LC panel so that the modulated light may broaden over a wide viewing zone. Since the light is diffused after modulation, uniform display characteristics can be obtained over a wide viewing zone if diffusion characteristics are uniform.

As methods of achieving such a parallel-light backlight, two method are proposed, a side-light type method (using a light guide member) and a "just-below-illumination" type method.

In the former method, another optical element for guiding light toward the LC panel 100 is provided on the light-guide plate 240 of the conventional side-light type backlight ("200" in FIG. 1).

On the other hand, in the latter method, an optical device for enhancing directivity of illumination light is provided on a light emission surface side of a conventional just-below type backlight. These methods, however, have the following problems.

In the side-light type method, the use of the light guide plate 240 is indispensable. If the size of the screen is increased, the weight of the LCD apparatus increases because of the light guide plate 240. When the size of the screen is increased, the number of fluorescent tubes needs to be increased in order to increase the flux of light. As a result, the light guide plate 240 with a great thickness is required.

On the other hand, in the just-below type method, the light guide plate is not used and thus the problem of weight is not important. However, in the conventional just-below type method, it is difficult to obtain a uniform illuminance distribution on the display panel 100 and a variance tends to arise in brightness.

For example, even in the case where a reflection plate with a parabolic cylinder shape is used, not only light reflected by the reflection plate but also light directly came from the light source will be made incident on the LC panel.

Thus, such non-uniformity occurs that the screen area close to the light source is bright but the other area on the screen is dark. In the conventional just-below type apparatus, loss of light in the optical element for enhancing directivity becomes relatively high because of its structure. It is therefore difficult to achieve both low power consumption and bright uniform display.

As has been described above, the side-light type method using the light guide plate is an illumination method unsuitable for the large screen. Besides, in the conventional just-below type method, a variance tends to occur in luminance and there is a great transmission loss of illumination light. It is thus difficult to achieve both low power consumption and bright uniform display.

BRIEF SUMMARY OF THE INVENTION

The present invention has been made in consideration of the above circumstances, and its object is to provide a backlighting apparatus wherein a "just-below-illumination" type parallel-light backlighting system is improved and thus the illumination efficiency can be improved while maintaining the uniformity in luminance, and the uniform display with low power consumption can be achieved even if the screen is enlarged, as well as a display apparatus using this backlighting apparatus.

In order to achieve the object, according to a first aspect of the invention, there is provided a backlighting apparatus for radiating light on a flat surface to be illuminated, the apparatus comprising:

a light source having a linear light emitting portion;

light shield means, provided along an outer periphery of the light source on the side of the to-be-illuminated surface, for shielding light traveling directly from the light source toward the to-be-illuminated surface; and a first optical element located parallel to the light source such that the first optical element faces the light source, the first optical element having a reflection surface for reflecting light emitted from the light source toward the to-be-illuminated surface, wherein a cross-sectional shape of the reflection surface in a direction perpendicular to the longitudinal direction of the light source is determined such that light reflected by the reflection surface of the first optical element has a substantially uniform illuminance distribution on the to-be-illuminated surface.

According to a second aspect of the invention, there is provided a display apparatus comprising:

a plate-shaped display panel;

a light source having a linear light emitting portion;

light shield means, provided along an outer periphery of the light source on the side of the display panel, for shielding light traveling directly from the light source to the display panel; and a first optical element provided in a longitudinal direction of the light source such that the first optical element faces the light source, the first optical element having a reflection surface for reflecting light emitted from the light source toward the display panel, wherein a cross-sectional shape of the reflection surface in a direction perpendicular to the longitudinal direction of the light source is determined such that light reflected by the reflection surface of the first optical element has a substantially uniform illuminance distribution on the display panel.

Specifically, in this backlighting apparatus, a linear light source is used as the light source. The light shield means such as a light shield plate is provided on the to-be-illuminated surface side of the linear light source. The light shield means shields light traveling directly from the light source toward the to-be-illuminated surface.

In order to utilize the linear shape of the light source, the first optical element is provided such that the light source is interposed between the first optical element and the to-be-illuminated surface.

In this case, the light source has a linear shape, and the longitudinal direction of the reflection surface is situated parallel to the longitudinal direction of the light source. Thus, only by determining the cross-sectional shape of the reflection surface, can the reflection surface be obtained such that a substantially uniform illuminance distribution is obtained on or near the to-be-illuminated surface.

By the combination of the cross-sectional shape of the reflection surface and the light shield means, the uniformity in illuminance on the to-be-illuminated surface can be achieved. Accordingly, if this backlighting apparatus is used as a backlight for the display panel, the variance in luminance can be eliminated.

It is preferable that the second optical element for improving the directivity of reflection light from the first optical element be provided on or near the to-be-illuminated surface on which the luminance is set to be uniform by the first optical element. Thereby, parallel light with a uniform illuminance distribution can be obtained, and display characteristics can be improved.

The directivity of reflection light from the first optical element is generally high in a direction perpendicular to the longitudinal direction of the light source. Thus, with the structure in which the directivity of reflection light is further improved by the second optical element, a loss in light at the time of obtaining light with good directivity can be greatly reduced, compared to the case where dispersion light from the light source is directly received and the directivity of this light is improved.

It is normally sufficient that the second optical element improves the directivity of light only in one direction perpendicular to the longitudinal direction of the light source so that a broadening angle of light may decrease. It is possible, however, that the second optical element comprises two optical elements to improve the directivity in two directions perpendicular to each other. Thereby, the directivity of light can be fully improved not only in a direction perpendicular to the longitudinal direction of the light source but also in a direction parallel to the longitudinal direction of the light source.

It is preferable that a low-reflectance region or a reflection region having a different radius of curvature, which extends in the longitudinal direction of the light source, be provided near a central area on the reflection surface of the first optical element. It is thus possible to prevent degradation in directivity due to light reflected by the reflection surface toward the light source.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE INVENTION

Embodiments of the present invention will now be described with reference to the accompanying drawings.

Figure 2:
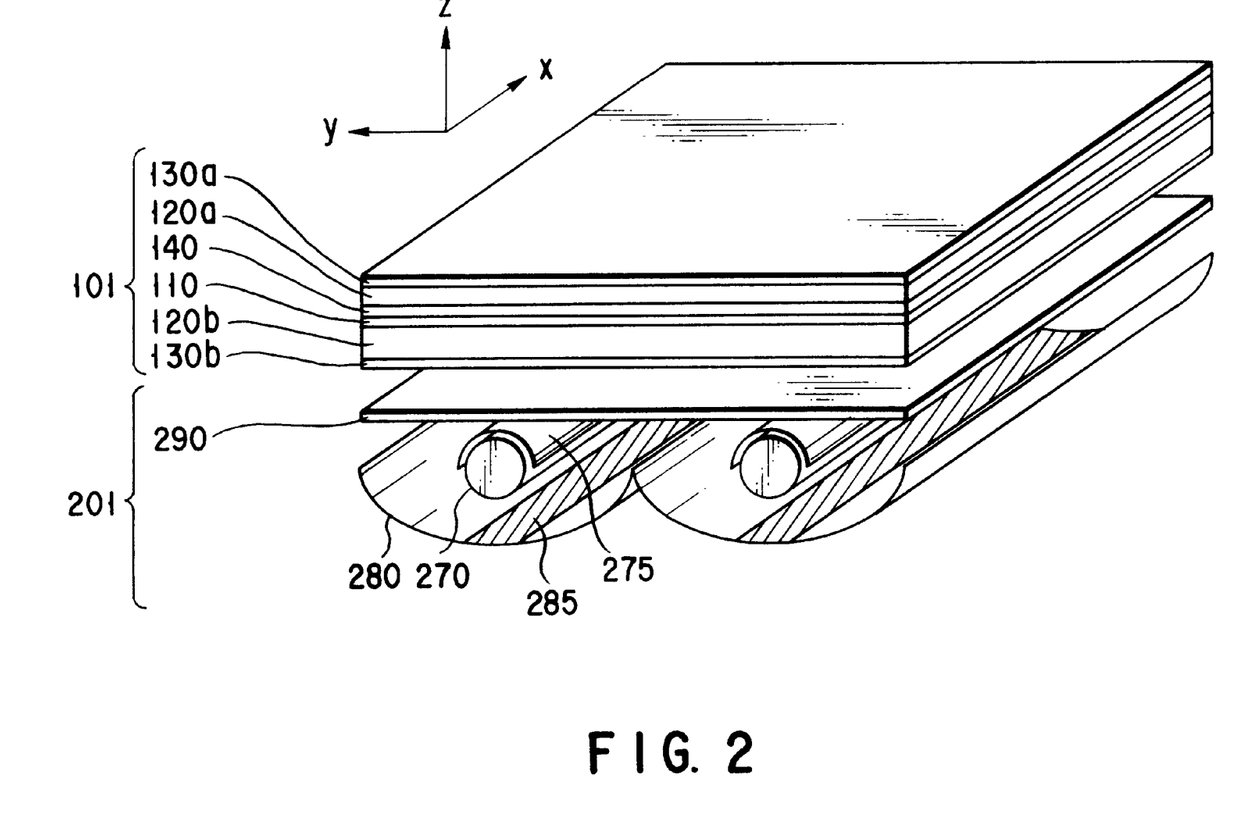
FIG. 2 is a perspective view showing a structure of a display apparatus according to a first, embodiment of the present invention.

FIG. 2 shows a structure of a display apparatus according to a first embodiment of the present invention. This display apparatus is a flat panel display used as a display monitor for a computer or a wall TV. In the structure shown in FIG. 2, a liquid crystal (LC) panel is used as display panel.

The display apparatus comprises a light-modulation element 101 functioning as display panel, and an illumination device 201 for illuminating the light-modulation element 101.

The illumination device 201 is a backlight device which illuminates a rear surface of the display panel by using a "just-below" type parallel-light backlight system. A thin fluorescent tube or a linear light source is used as a light source 270. It should suffice if the number of fluorescent tubes is one or more. In FIG. 2, two fluorescent tubes are used.

A light shield plate 275 is provided on the light-modulation element (101) side of the fluorescent tube 270. It is preferable that the light shield plate 275 have a diffusion reflection surface on the fluorescent tube side thereof, and an absorption surface on the light-modulation element (101) side thereof.

Since the light shield plate 275 can shield light which will directly travel from the fluorescent tube to the light-modulation element 101, it is possible to prevent a light component with low directivity from mixing in light illuminating the light-modulation element 101.

The provision of the light shield plate 275 may be replaced with the use of a fluorescent tube, e.g. an aperture-type fluorescent tube, having part of its light emission portion covered with a light shield layer, and also having its light shield layer side directed to the light-modulation element 101.

Reflection plates or first optical elements 280 are provided to face the associated light sources 270 such that the light sources 270 are sandwiched between the light-modulation element 101 and the associated first optical elements 280. The reflection plate 280 functions to reflect light emitted from the light source 270 towards the light-modulation element 101. As is shown in FIG. 2, the reflection plate 280 has such a substantially semicylindrical shape that its inner surface is curved so as to surround the fluorescent tube 270. The curved inner surface is used as a reflection surface. The semicylindrical reflection plate 280 is provided in parallel to the longitudinal direction of the fluorescent tube or light source 270. The number of the reflection plates 280 is one or more and corresponds to the number of fluorescent tubes used as light sources 270.

The light emanating from each light source 270 is reflected by the portion of the associated first optical element 280. The reflected light passes through the lens plate or second optical element 290 and is radiated on the light-modulation element 101 disposed near the plane to be illuminated.

Figure 3:
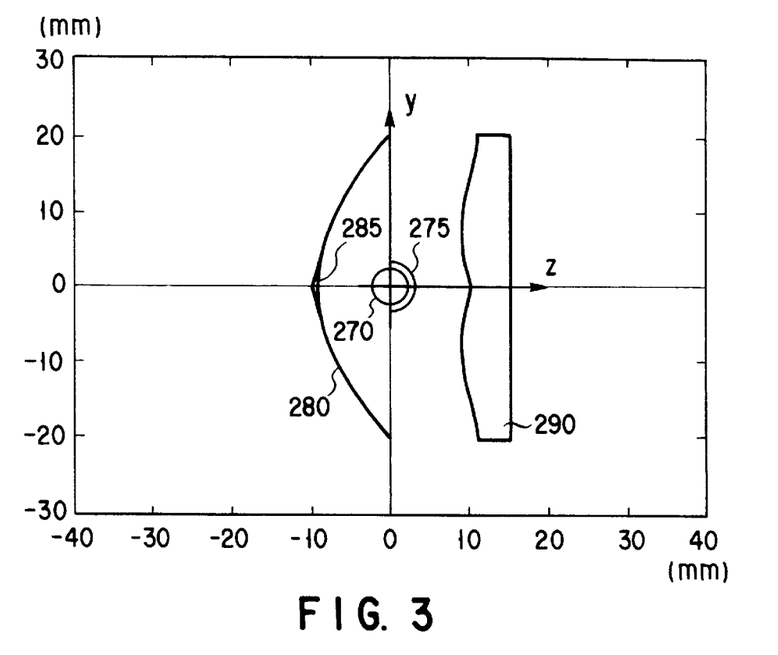
FIG. 3 shows examples of cross-sectional views of first and second optical elements provided in a backlight unit of the display apparatus according to the first embodiment.

FIG. 3 shows examples of specific shapes of those portions of the reflection plate or first optical element 280 and the lens plate or second optical element 290, which are associated with one light source.

As is shown in FIG. 3, the portion of the reflection plate (first optical element 280), which corresponds to the light source, is a concave mirror, and the lens plate (second optical element 290) is a convex lens having a recess at its central portion.

The shape of the reflection plate is optimized so that reflection light may have a high directivity in the y-direction (i.e. a y-component of the vector of the reflected beam being approximately zero) and the illuminance distribution on an to be illuminated plane (i.e. a plane in which the light-modulation element 101 is present) may be uniform.

The light source 270 has a linear shape, and the longitudinal direction of the reflection surface of the reflection plate is parallel to the x-direction or the longitudinal direction of the light source 270. Thus, the uniformity of illuminance distribution can be ensured only by determining the cross-sectional shape of the reflection plate in the y-direction which is perpendicular to the longitudinal direction of the light source 270.

The shape of the lens plate is optimized so that the directivity of the illumination light having passed through the second optical element 290 may be further improved (i.e. the y-component of the vector of the light may further approach zero).

As has been described above, the reflection light from the first optical element, which is provided mainly for the purpose of ensuring uniformity in illuminance distribution, has good directivity in the y-direction. Taking advantage of this feature, the directivity in y-direction of the reflection light is further improved by the second optical element 290. Thus, the linear shape of the light source 270 is effectively utilized, and the directivity of light is efficiently improved. Therefore, a loss in light at the time of obtaining light with good directivity can be reduced, and not only the uniformity of illuminance distribution but also the efficiency of use of light can be enhanced.

Specific examples of the shapes of surfaces of the reflection plate and lens plate shown in FIG. 3 will now be described.

In the first embodiment, the lens plate is supposed to be an optical element having a curved surface on the reflection plate side and a flat surface on the other side, and the shapes of the surfaces are determined by the optimizing process. In addition, in the structure of the first embodiment, it is supposed that the cross-sectional shapes of those portions of the reflection plate and lens plate, which are associated with one light source, are represented by the following equations, and that the portions with such cross-sectional shapes, the number of which portions corresponds to the number of light sources, are arranged in the y-direction, thereby constituting the reflection plate and the lens plate.

Where a coordinate system is determined such that the central axis of the fluorescent tube coincides with the x-axis of the coordinate system and the direction toward the light-modulation element 101 is parallel to the z-axis, it is supposed that a y-z cross-sectional shape of the portion of the reflection plate, which portion corresponds to the light source, is expressed by $$z=(|y|-w)(a+b|y|+cy^2+d|y|^3+\ldots+h|y|^7) \quad (1)$$

where w indicates a half-width of the reflection plate in the portion of the y-z cross section. In this case, coefficients of the polynomial are:

a=0.497724124E+00 b=0.199063023E−01 c=−0.515457186E−03 d=0.629209089E−04 e=0.374200363E−05 f=−0.886034289E−06 g=0.524235466E−07 h=−0.102380846E−08 w=20

Similarly, where a coordinate system is determined such that the central axis of the fluorescent tube coincides with the x-axis of the coordinate system and the direction toward the light-modulation element 101 is parallel to the z-axis, it is supposed that a y-z cross-sectional shape of the portion of the lens plate, which portion corresponds to one light source, is expressed by $$z=10+a+b|y|+cy^2+d|y|^3+\ldots iy^8) \quad (2)$$

In this case, coefficients of the polynomial are:

a=−0.119634474E+00 b=−0.308210300E+00 c=0.575133669E−01 d=−0.156170273E−01 e=0.326949908E−02 f=−0.367693791E−03 g=0.224403428E−04 h=−0.700590333E−06 i=0.871871614E−08

The refractive index n of the material of the lens plate is set at n=1.51.

The cross-sectional shape of each portion of the reflection plate and lens plate, as defined by equations (1) and (2), is unchanged in the x-direction over the length of this element (i.e. the length of the fluorescent tube).

In the present embodiment, as shown in FIG. 2, a strip-like region 285 with a low reflectance is provided in the x-direction on a central area (an area near y=0) of that portion of the reflection plate, which corresponds to one light source.

Since the light reflected by this area becomes a component with low directivity, the component with low directivity can be decreased by lowering the reflectance of this area. Alternatively, the area with low reflectance may be replaced with a reflection area having a radius of curvature different from that of adjacent areas, thereby preventing reflection light from this area from entering the second optical element 290.

In particular, if the reflection area is designed to return to the light source 270, the light returned to the light source 270 is reused and the light source with good directivity is achieved without deteriorating the light use efficiency.

The light-modulation element 101 may be of any type if the intensity of incident light can be modulated. For example, it may use a liquid crystal material such as TN liquid crystal, STN liquid crystal or ferroelectric liquid crystal, or it may not use such a liquid crystal. However, the light-modulation element 101 needs to have a diffusion layer with diffusion properties at least in one direction in order to ensure a wide view field. If a TN LC panel is to be used as light-modulation element 101, the following structure is preferable.

The basic structure is the same as the conventional one. The LC layer 110 is sandwiched between two glass plates 120a and 120b, and the two glass plates 120a and 120b are sandwiched between two polarizing plates 130a and 130b.

In the above structure, a diffusion layer 140 is provided on the observer side (i.e. the side opposite to the illumination system) of the LC layer 110. In this embodiment, the diffusion layer 140 is provided between the LC layer 110 and glass plate 120a.

In a case where a diffusion layer 140 having diffusion properties in one direction or diffusion properties varying in accordance with directions is used, the direction of the diffusion layer 140 is determined so that the direction dependency of the broadening angle of light, which has passed through the diffusion layer 140, may become lower than at the time of incidence on the diffusion layer 140.

The illumination light incident on the light modulation device 101 reaches a light modulation layer (the LC layer 110 in this embodiment) and is modulated there. The illumination light incident on the LC layer 110 is diffused light almost completely in the x-direction (parallel to the xz-plane) but it has a small broadening angle and good directivity in the y-direction (parallel to the yz-plane) by virtue of the function of the first and second optical elements 280 and 290. Accordingly, relatively good modulation characteristics can be obtained even if the modulation element with modulation characteristics dependent on the incident angle, such as a TN liquid crystal element, is used as light modulation element 101.

In particular, the conventional TN LC panel has a relatively wide viewing zone in the right-and-left direction (i.e. horizontal display line direction), as viewed when the observer faces the panel, but a narrow viewing zone in the up-and-down direction (i.e. vertical line direction). Accordingly, in the structure of the present embodiment, if the longitudinal direction (x-direction) of the light source 270 is made to agree with the right-and-left direction of the panel (i.e. horizontal display line direction), the display characteristics in the up-and-down direction (vertical line direction) can be greatly improved.

Light modulated by the LC layer 110 of light modulation element 101 is diffused by the diffusion layer 140 and dispersed substantially isotropically in the observation region. In this embodiment, since the diffusion layer having sufficient diffusion characteristics at least in the y-direction is used as diffusion layer 140, good display characteristics can be obtained in a wide viewing zone.

Figure 4:
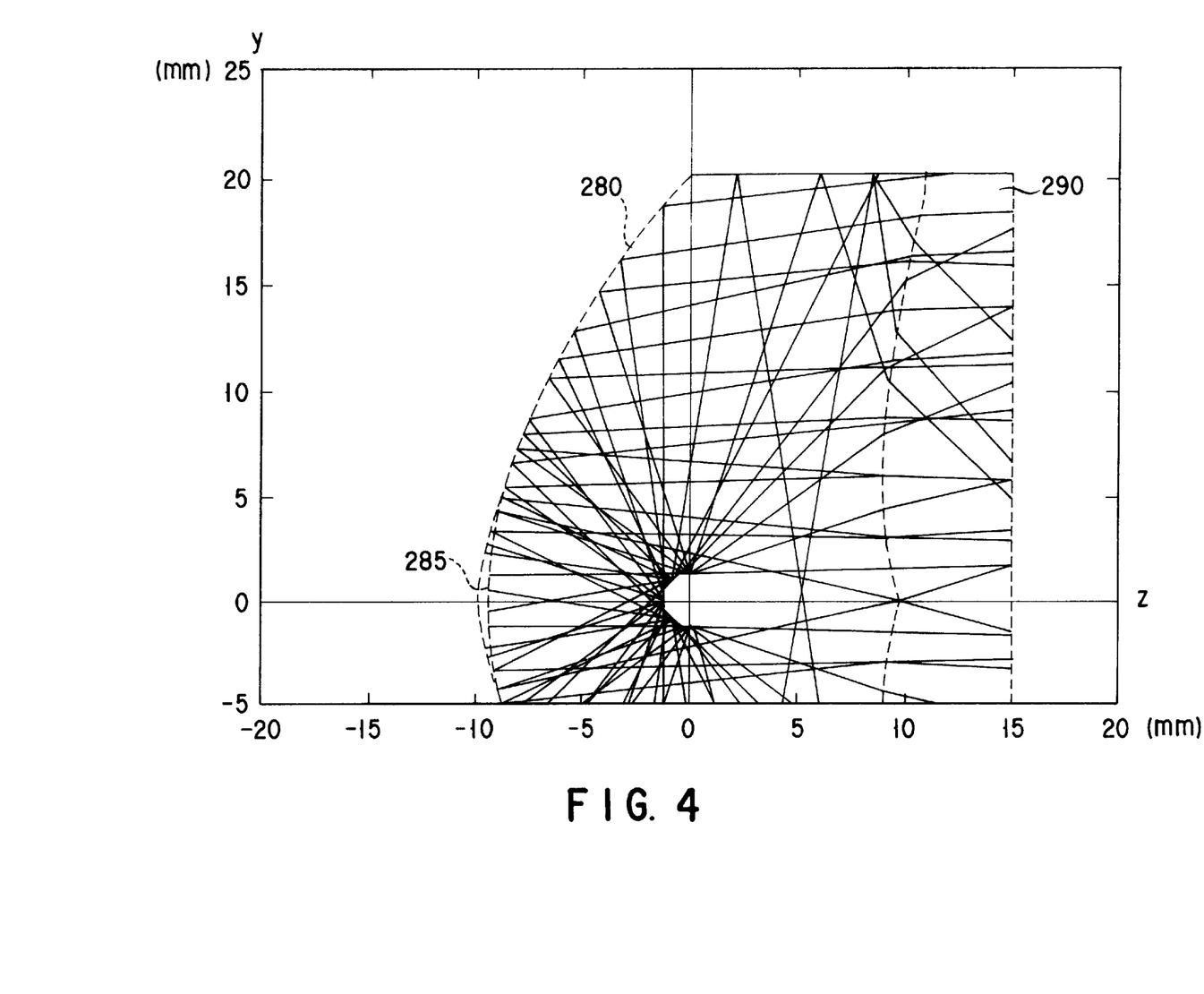
FIG. 4 shows an evaluation result on loci of light beams in the backlight unit of the display apparatus according to the first embodiment.
Figure 5:
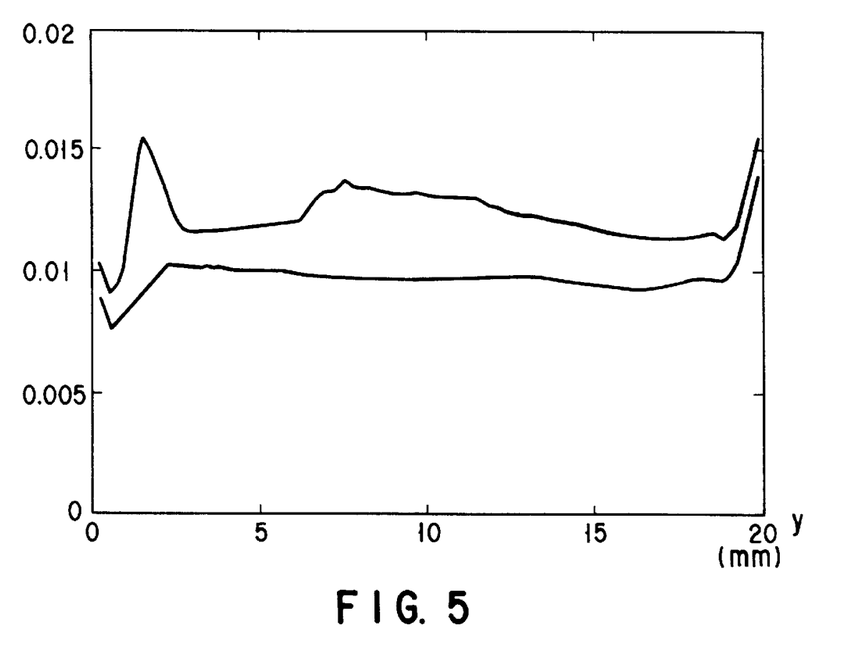
FIG. 5 shows an evaluation result on an illuminance distribution in the backlight unit of the display apparatus according to the first embodiment.

FIGS. 4 and 5 show evaluation results by simulation of the parts of illumination device 201 of the display apparatus of the present embodiment.

FIG. 4 shows yz-cross-sectional shapes of upper half portions of those parts of the reflection plate used as first optical element 280 and the lens plate used as second optical element 290, which are associated with the single light source 270, and also shows light paths of light rays.

FIG. 5 shows an illuminance distribution on a light emission side face (i.e. the face closer to the observer) of the lens plate used as second optical element 290. The horizontal axis of the illuminance distribution corresponds to the y-axis (the origin of which corresponds to the center of light source 270), and the vertical axis indicates relative values of illuminance.

The upper solid line in FIG. 5 showing the illuminance distribution indicates total illuminance of light components in all directions, and the lower solid line indicates illuminance of light components in a range of azimuth angle of ±15° with respect to the z-axis in the yz-plane.

In the yz-plane, most of illumination light is light components with azimuth angles of ±15° with respect to the z-axis, and it is understood that most of illumination light has good directivity and that good characteristics with small variance in illuminance are obtained.

Modifications of the parts of the illumination device 201 of the display apparatus of this embodiment and evaluation results thereof will now be described. In the modifications, the region 285 in which light reflectance is low is not provided. The loci of light rays and the illuminance distribution in this case are shown in FIGS. 6 and 7.

Figure 6:
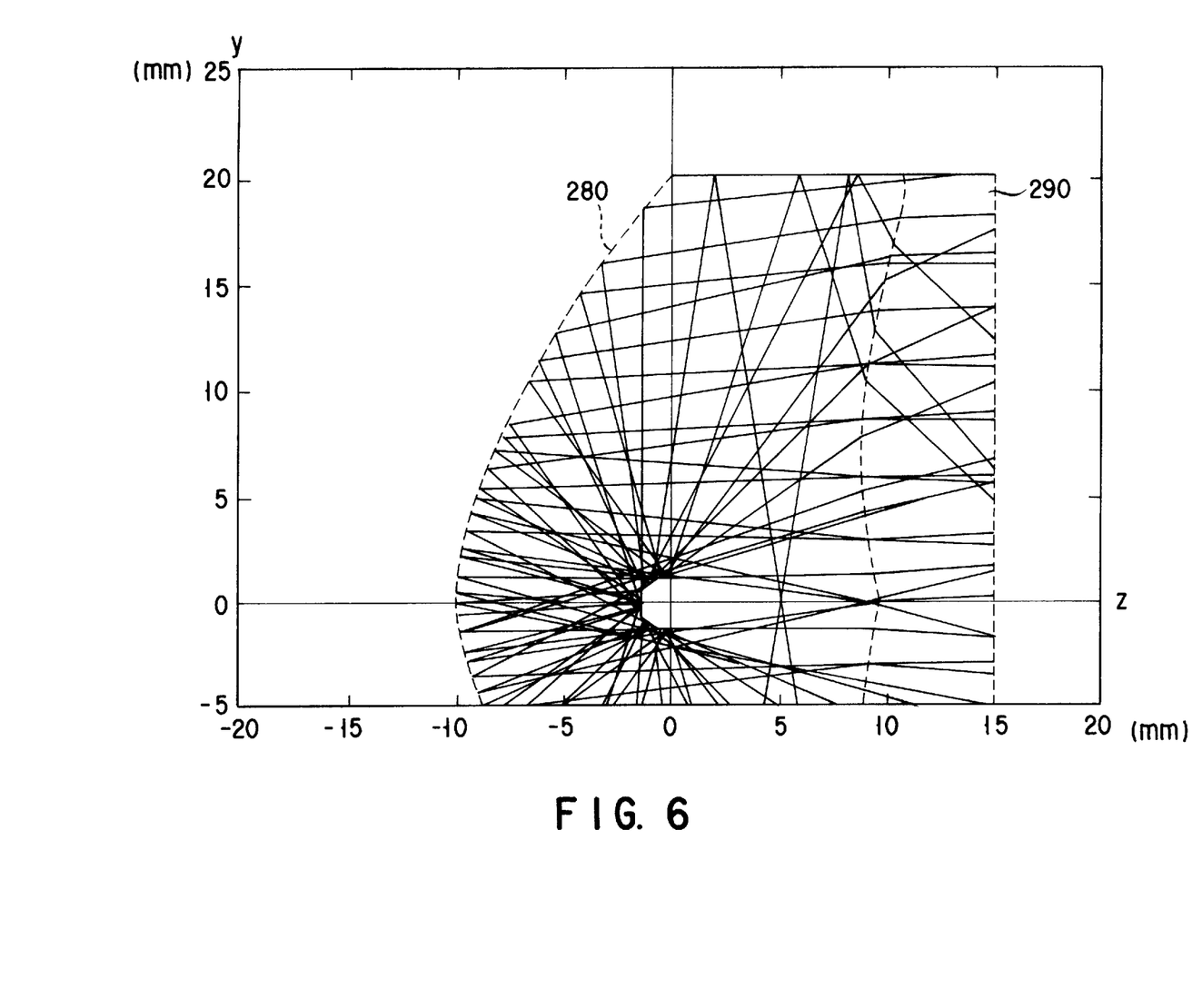
FIG. 6 shows an evaluation result on loci of light beams in a case where a low-reflectance region is excluded from the backlight unit of the display apparatus according to the first embodiment.
Figure 7:
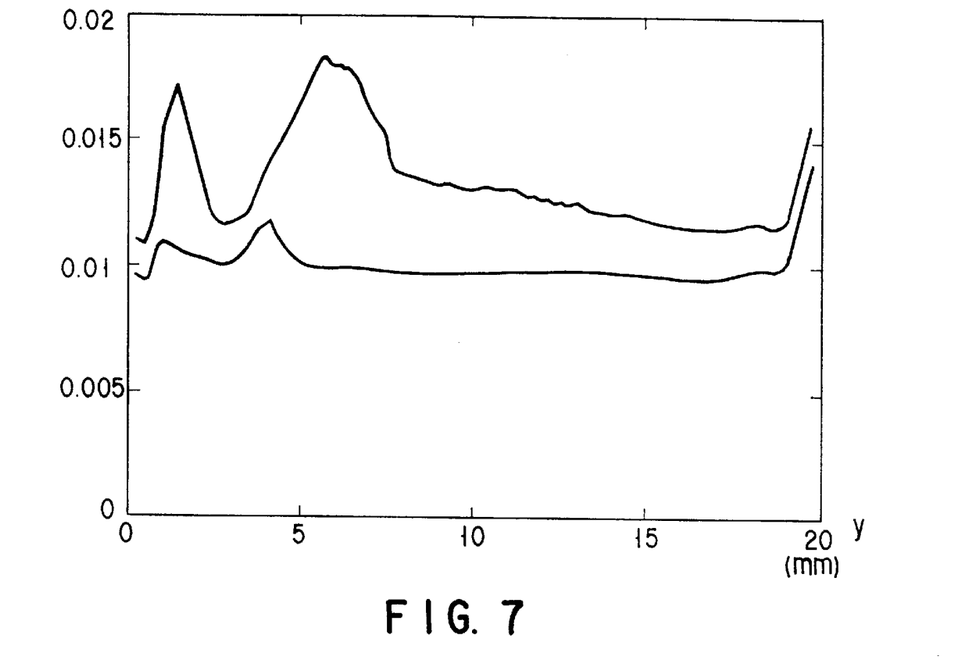
FIG. 7 shows an evaluation result on an illuminance distribution in a case where a low-reflectance region is excluded from the backlight unit of the display apparatus according to the first embodiment.

As is understood from FIGS. 6 and 7, even in the case where the region 285 with low light reflectance is not provided, the illuminance distribution (indicated by the lower solid line in FIG. 7) of light components with good directivity, in particular, is not greatly different from that shown in FIG. 5.

In fact, in the modifications, there are many light components with low directivity in the region near the light source on the light emission face of the lens plate (second optical element 290). If the illumination device with this structure is used as a backlight of the display apparatus, sufficient display characteristics may not be obtained.

However, if the quantity of light with low directivity is within an allowable range, the region 285 with low reflectance may be dispensed with.

As has been described above, in the present embodiment, light traveling directly to the light modulation element 101 from the light source is shielded by the light shield plate 275, and the shapes of the reflection plate 280 (first optical element) and lens plate 290 (second optical element) are optimized. In addition, the region 285 with low reflectance may be provided, and illumination light with a uniform illuminance distribution and good directivity can be efficiently obtained.

The surface shapes of the first optical element 280 and the second optical element 290 are not limited to those expressed by the coefficients and formulae in the embodiment, if the surface shapes are defined according to the spirit of the present invention.

Besides, the region 285 is not limited to the region with low reflectance and may be replaced with a reflection plate which forms a real image of the light source 270 close to the light source. In brief, there is no problem if the light reflected by this region is shielded by the light source 270 itself and is prevented from reaching the second optical element 290. For this purpose, for example, the low-reflectance region 285 may be replaced with a region provided at or near a central portion of the reflection plate, which has a radius of curvature different from that of the surrounding region, as mentioned above.

Figure 8:
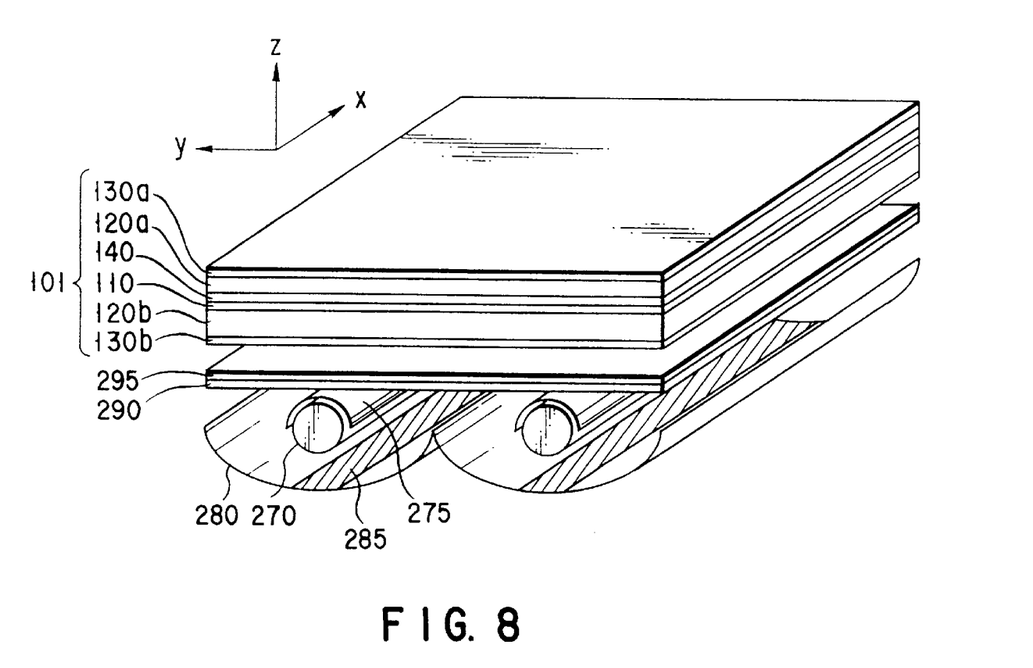
FIG. 8 is a perspective view showing a structure of a display apparatus according to a second embodiment of the present invention.

FIG. 8 shows the structure of a display apparatus according to a second embodiment of the present invention.

In the second embodiment, an optical element 295 (hereinafter referred to as "directivity-improving element") for improving directivity of light is added to the structure of the first embodiment as shown in FIG. 2, and the diffusion layer 140 is replaced with one capable of diffusing light both in vertical and horizontal directions.

The directivity-improving element 295 improves directivity of illumination light in the x-direction (i.e. direction parallel to the xz-plane) and thus the modulation characteristics in the light modulation element 101 can be further improved. The modulated light is broadened in a conical shape by the diffusion layer 140, and a wide viewing zone can be obtained, as in the first embodiment.

Figure 10A:
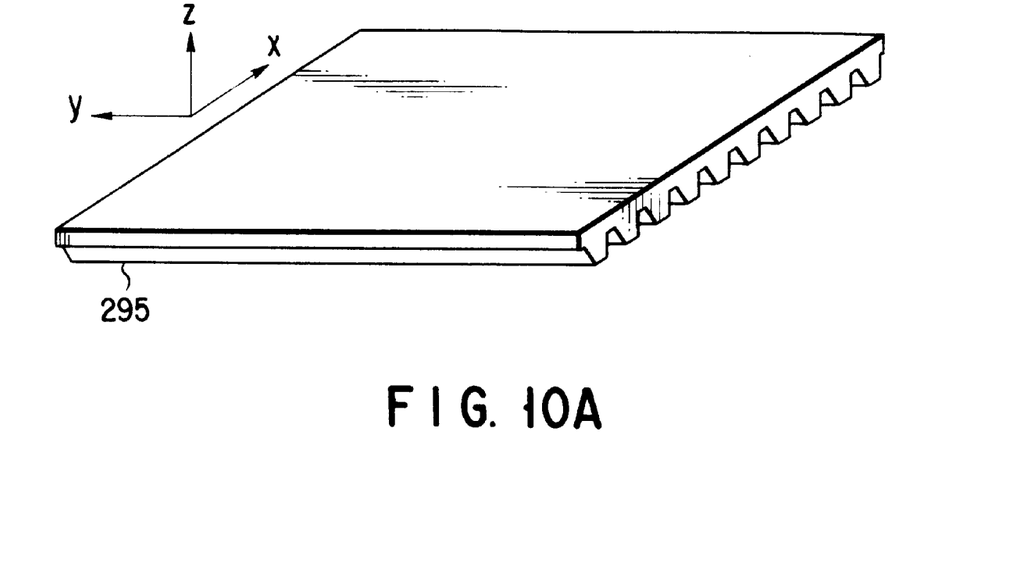
FIG. 10A shows an example of the shape of the directivity improving element provided on the backlight unit of the display apparatus according to the second embodiment.
Figure 10B:
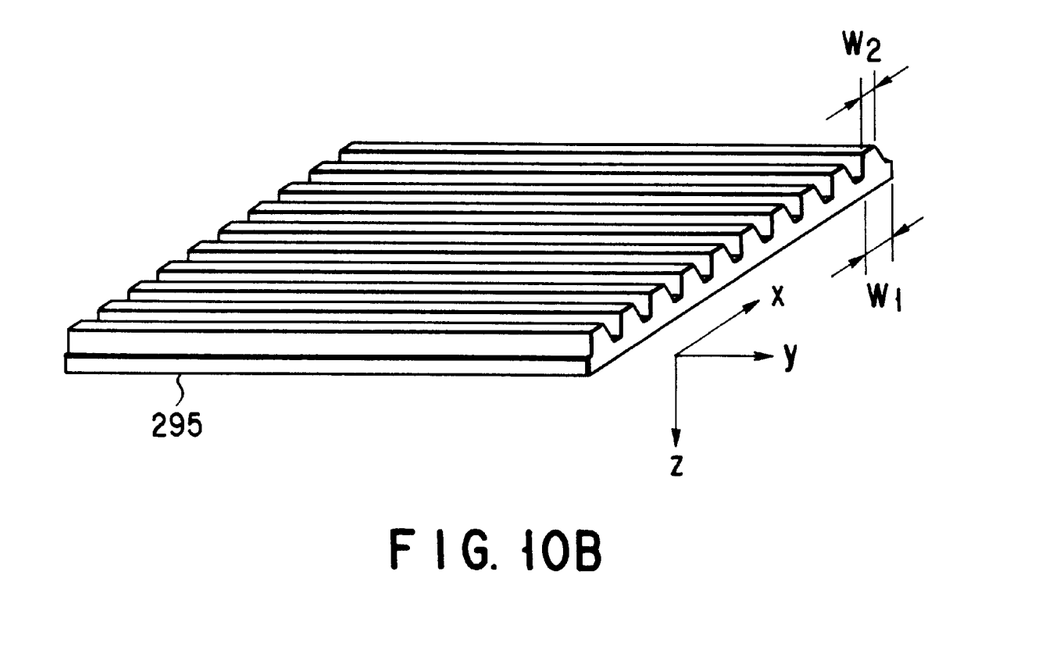
FIG. 10B shows the example of the shape of the directivity improving element provided on the backlight unit of the display apparatus according to the second embodiment.

An element with a shape shown in FIGS. 10A and 10B, for example, can be used as the directivity-improving element 295. FIG. 10A shows the directivity-improving element 295, as viewed from the light modulation element (101) side, and FIG. 10B shows the opposite side of the element 295.

The element 295 is constructed such that a plurality of parallel grooves, each having a triangular cross section, are formed in a transparent plate-like sheet. The width (W2) of each ridge portion of the grooves is less than the pitch (W1) of troughs of the grooves.

Figure 9:
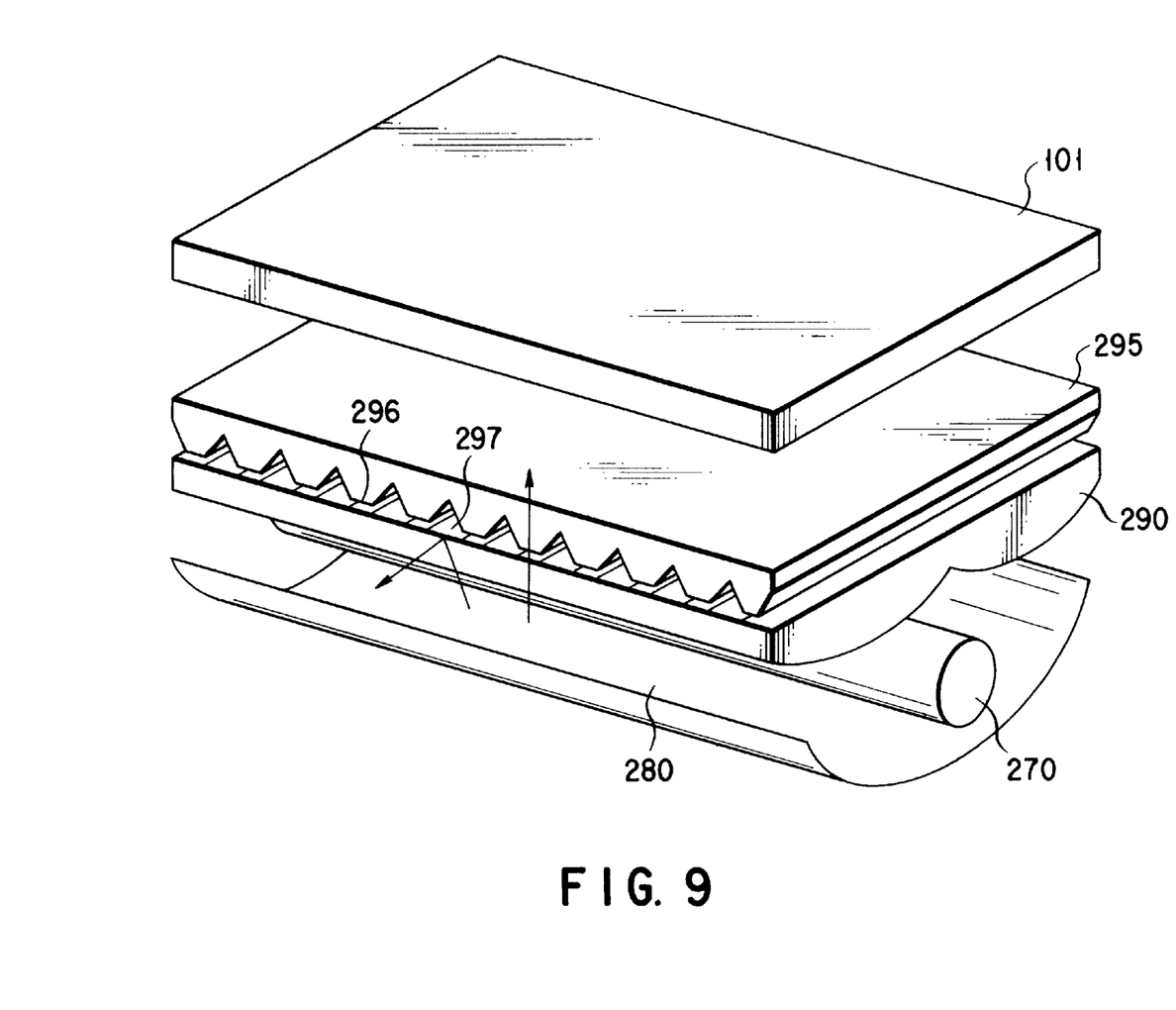
FIG. 9 shows a structure and a function of a directivity improving element provided on the backlight unit of the display apparatus according to the second embodiment.

As is shown in FIG. 9, the grooved surface of the element 295 is attached to the lens plate 290 such that the direction of grooves is perpendicular to the longitudinal direction of the light source 270. Non-contact portions 297 of the attached surface of the element 295 are provided with reflection films so that only light, which has passed through contact portions 296 where the ridge portions of the element 295 and the lens plate 290 make contact with each other, may illuminate the light modulation element 101.

The light, which has passed through the narrow opening (W2), emanates from the wide opening (W1), and thus the directivity of illumination light is improved. The cross-sectional shape of the groove is not limited to the triangular shape which is adopted in this embodiment, since the directivity of outgoing light is basically determined by the ratio of opening. Thus, the cross-sectional shape of the groove may be a curved one or a combination of a straight line and a curved line.

If the directivity-improving element 295 is attached to the lens plate 290 with an adhesive put at the contact portions 296 between the element 295 and lens plate 290, displacement or warp of the lens plate 290 can be prevented.

Figure 11:
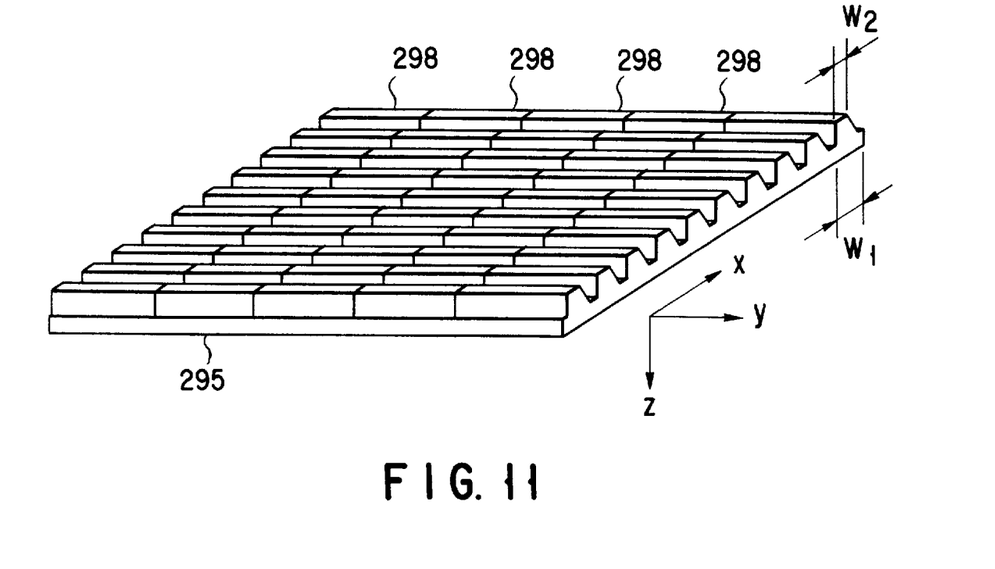
FIG. 11 shows another example of the shape of the directivity improving element provided on the backlight unit of the display apparatus according to the second embodiment.
Figure 12:
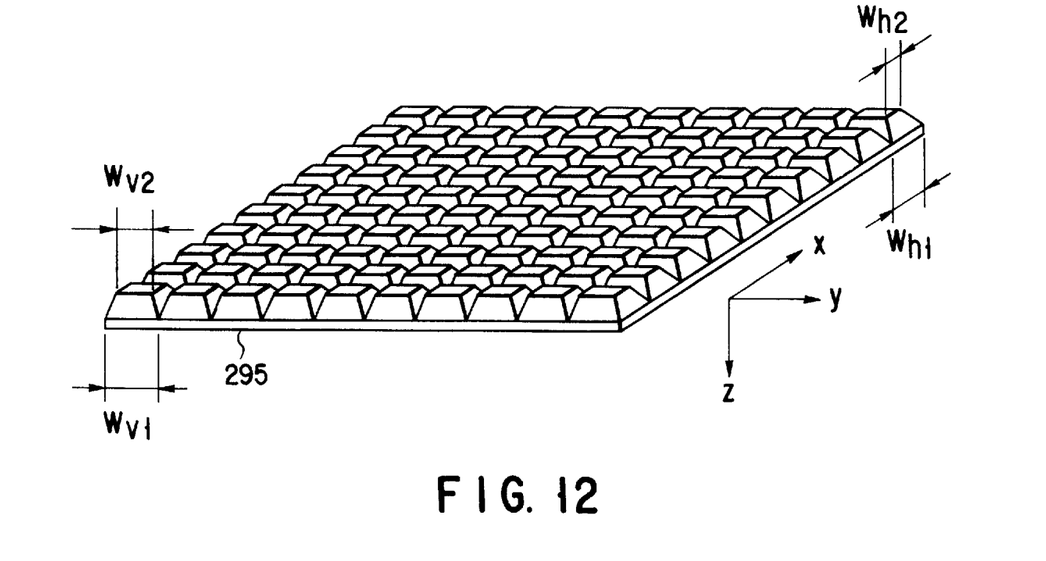
FIG. 12 shows a still another example of the shape of the directivity improving element provided on the backlight unit of the display apparatus according to the second embodiment.

If elements shown in FIGS. 11 and 12, for example, are used as directivity-improving element 295, display characteristics can be further improved. FIGS. 11 and 12 show the light source sides of the elements and correspond to FIG. 10B.

In the element shown in FIG. 11, strip-like light shield layers 298 are provided in a direction perpendicular to the grooves. The light shield layers 298 should have, for example, light absorption properties.

With the provision of the light shield layers 298, that portion of light incident on the directivity-improving element 295, which has a large component in the y-direction (parallel to the grooves) of the incident angle, can be removed.

In general, such a light component is very small in the backlighting apparatus using the reflection plate 280 and lens plate 290. However, such a light component will result in a blur in displayed characters. If this light component is reduced by using the directivity-improving element 295 of the second embodiment, better display characteristics can be obtained.

In the element shown in FIG. 12, a plurality of grooves each having a triangular cross section are additionally formed in a direction perpendicular to the grooves shown in FIG. 10B. Thus, trapezoidal projections are provided in a matrix on the surface of the transparent plate-like sheet. According to this structure, the directivity of light in the y-direction (parallel to the yz-plane) can also be improved with the same principle as the grooves shown in FIG. 10B, the directivity characteristics in both x- and y-directions can be improve, as with the case of FIG. 11.

When the structure of FIG. 12 is adopted, a backlight with higher illumination efficiency can be achieved than in the case of the conventional just-below-illumination type backlight.

The reason is that in the second embodiment, light with relatively high directivity is generally made incident on the directivity-improving element 295 and thus it is not necessary to improve the directivity in the y-direction so much as the directivity in the x-direction and it is not necessary to reduce the ratio of the light-source-side opening width Wv2 to the opening width Wv1 on the light modulation element (101) side of the directivity-improving element 295 so much as the ratio of Wh2 to Wh1.

Figure 13:
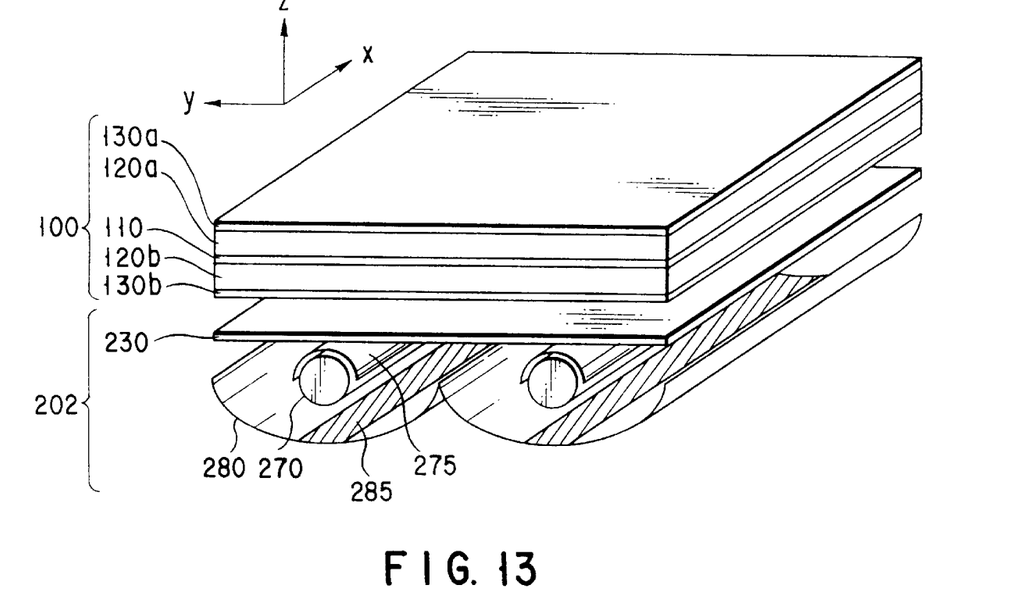
FIG. 13 is a perspective view showing a structure of a display apparatus according to a third embodiment of the present invention.

FIG. 13 shows a third embodiment of the present invention.

In the third embodiment, the structure of the first embodiment is simplified. In an backlighting apparatus 202, the light source 270 and reflection plate 280 have the same structures as those in the first embodiment. However, the lens plate 290 of the first embodiment replaced with a diffusion plate 230. The light modulation element 100 is the same as the conventional one shown in FIG. 1.

In the first embodiment, the reflection plate 280 is designed such that a uniform illuminance distribution is obtained near the light modulation element 101. In the third embodiment, a substantially uniform illuminance distribution is obtained on the diffusion plate 230.

The reason is that since the thickness of the light modulation element 101, in general, is much less than that of the backlighting apparatus 201, 202, a substantially uniform illuminance distribution can be obtained in a plane near the LC layer 110 even if the light modulation element 101 is designed such that a uniform illuminance distribution is obtained in the plane of LC layer 110 of light modulation element 101.

Accordingly, if the light modulation element 100 is placed on the diffusion plate 230, display with uniform luminance can be achieved. In order to obtain good display characteristics in a wide range in the third embodiment, however, it is necessary to use the light modulation element having good modulation characteristics with respect to light with a great incidence angle, since diffusion light passes through the light modulation element 100. Besides, the light modulation element 100 may be replaced with the light modulation element 101 of the first embodiment.

Figure 14:
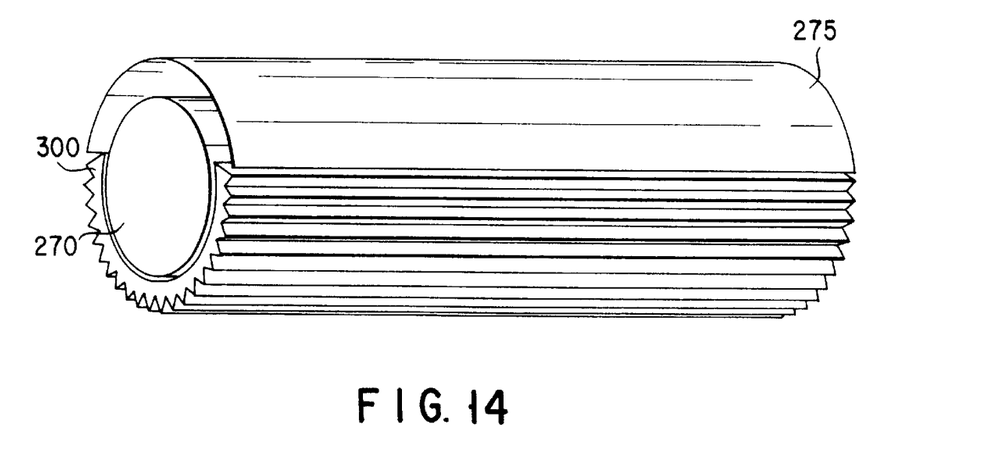
FIG. 14 shows an example of the structure of a light source applied to each of the embodiments of the invention.

FIG. 14 shows another example of the structure of the fluorescent tube used as light source 270 in each of the above embodiments.

The light source 270 in FIG. 14 has such a structure that a prism sheet 300 is wound around the fluorescent tube. With the characteristics of the prism sheet 300, the amount of a light component traveling from each point on the light emission face of the fluorescent tube in directions other than a normal direction can be reduced, and most of light can be made to travel in the normal direction. Thereby, the shape of the first optical element 280 determined by optimization can be function more properly, and the uniformity in illuminance distribution and the directivity of light can be improved.

In the above embodiments, the backlighting apparatus 201, 202 is used as an illumination light source for the LCD panel. However, the backlighting apparatus can be applied to an illumination light source for other display devices such as a projector, if such devices require a uniform illuminance distribution on a surface to be illuminated.

As has been described above, according to the backlighting apparatus of the present invention, the just-below-illumination type parallel-light backlight system is improved. Thus, the light use efficiency can be improved while maintaining the uniformity in luminance, and the uniform display with low power consumption can be achieved even if the screen is enlarged.

Furthermore, a display apparatus with low power consumption, which permits the user to view a display image on a bright, large screen in a wide range, can be achieved by using the above backlighting apparatus.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A backlighting apparatus for radiating light to a flat surface to be illuminated, the apparatus comprising:

a light source having a linear light emitting portion;

light shield means, provided along an outer periphery of the light source on the side of said to-be-illuminated surface, for shielding light traveling directly from the light source toward the to-be-illuminated surface; and a first optical element located parallel to the light source such that the first optical element faces the light source, the first optical element having a reflection surface for reflecting light emitted from the light source toward the to-be-illuminated surface, wherein a cross-sectional shape of the reflection surface in a direction perpendicular to the longitudinal direction of the light source is determined such that light reflected by the reflection surface of the first optical element has a substantially uniform illuminance distribution on the to-be-illuminated surface.

2. The backlighting apparatus according to claim 1, wherein a central portion of said reflection surface is provided with a low-reflectance region having a lower reflectance than the other region on the reflection surface, the low-reflectance region extending in the longitudinal direction of the light source.

3. The backlighting apparatus according to claim 1, wherein a central portion of said reflection surface is provided with a reflection region having a radius of curvature different from a radius of curvature of the other region on the reflection surface, the reflection region extending in the longitudinal direction of the light source.

4. The backlighting apparatus according to claim 1, further comprising a second optical element for improving directivity of light from the first optical element and guiding the light with the improved directivity to the to-be-illuminated surface.

5. The backlighting apparatus according to claim 2, further comprising a second optical element for improving directivity of light from the first optical element and guiding the light with the improved directivity to the to-be-illuminated surface.

6. The backlighting apparatus according to claim 3, further comprising a second optical element for improving directivity of light from the first optical element and guiding the light with the improved directivity to the to-be-illuminated surface.

7. The backlighting apparatus according to claim 4, wherein the second optical element improves the directivity of light both in a direction parallel to the longitudinal direction of the light source and in a direction perpendicular to said parallel direction.

8. The backlighting apparatus according to claim 5, wherein the second optical element improves the directivity of light both in a direction parallel to the longitudinal direction of the light source and in a direction perpendicular to said parallel direction.

9. The backlighting apparatus according to claim 6, wherein the second optical element improves the directivity of light both in a direction parallel to the longitudinal direction of the light source and in a direction perpendicular to said parallel direction.

10. The backlighting apparatus according to claim 1, further comprising a diffusion plate for diffusing light from the first optical element and guiding the diffused light to the to-be-illuminated surface.

11. The backlighting apparatus according to claim 2, further comprising a diffusion plate for diffusing light from the first optical element and guiding the diffused light to the to-be-illuminated surface.

12. The backlighting apparatus according to claim 3, further comprising a diffusion plate for diffusing light from the first optical element and guiding the diffused light to the to-be-illuminated surface.

13. A display apparatus comprising:

a plate-shaped display panel;

a light source having a linear light emitting portion;

light shield means, provided along an outer periphery of the light source on the side of the display panel, for shielding light traveling directly from the light source to the display panel; and a first optical element located parallel to the light source such that the first optical element faces the light source, the first optical element having a reflection surface for reflecting light emitted from the light source toward the display panel, wherein a cross-sectional shape of the reflection surface in a direction perpendicular to the longitudinal direction of the light source is determined such that light reflected by the reflection surface of the first optical element has a substantially uniform illuminance distribution on the display panel.

14. The display apparatus according to claim 13, further comprising a second optical element, provided between the display panel and the light source, for improving directivity of light from the first optical element and guiding the light with the improved directivity to the display panel.

* * * * *

UNITED STATES PATENT AND TRADEMARK OFFICE
CERTIFICATE OF CORRECTION

PATENT NO. : 6,095,656
DATED : August 1, 2000
INVENTOR(S): Kei SHIMURA, et al.

It is certified that an error appears in the above-identified patent and that said Letters Patent is hereby corrected as shown below:

On the Title Page, Item [30] the Foreign Application Priority Data is incorrect. Item [30] should read as follows:

[30] Foreign Application Priority Data

Sept. 16, 1997   [JP]   Japan ................................9-250856

Signed and Sealed this

Seventeenth Day of April, 2001

Attest:

NICHOLAS P. GODICI

Attesting Officer     Acting Director of the United States Patent and Trademark Office